United States Patent
Ochi et al.

(10) Patent No.: US 6,503,172 B2
(45) Date of Patent: *Jan. 7, 2003

(54) CONTROL UNIT AND CONTROL METHOD OF AUTOMATIC TRANSMISSION AND AUTOMOTIVE VEHICLE

(75) Inventors: Tatsuya Ochi, Hitachi (JP); Toshimichi Minowa, Mito (JP)

(73) Assignee: Hitachi, Ltd., Tokyo (JP)

( * ) Notice: Subject to any disclaimer, the term of this patent is extended or adjusted under 35 U.S.C. 154(b) by 56 days.

This patent is subject to a terminal disclaimer.

(21) Appl. No.: 09/761,746

(22) Filed: Jan. 18, 2001

(65) Prior Publication Data

US 2002/0013195 A1 Jan. 31, 2002

Related U.S. Application Data

(63) Continuation-in-part of application No. 09/447,358, filed on Nov. 22, 1999, now Pat. No. 6,183,395.

(30) Foreign Application Priority Data

Nov. 20, 1998 (JP) .......................................... 10-331056

(51) Int. Cl.[7] .............................................. B60K 41/28
(52) U.S. Cl. ........................ 477/143; 477/79; 477/124; 477/906
(58) Field of Search ................................ 477/143, 154, 477/155, 906, 79, 125; 74/335, 339

(56) References Cited

U.S. PATENT DOCUMENTS

| 4,495,838 A | * | 1/1985 | Gooch ........................ 477/124 |
| 4,969,098 A |   | 11/1990 | Leising et al. ............... 477/154 |
| 5,046,383 A |   | 9/1991 | Butts et al. .................. 477/154 |
| 5,368,531 A |   | 11/1994 | Ando et al. .................. 477/155 |
| 5,846,159 A | * | 12/1998 | Janecke et al. .............. 477/906 |
| 5,865,708 A | * | 2/1999 | Nishio et al. ................ 477/155 |
| 6,145,399 A | * | 11/2000 | Bockmann et al. ......... 477/124 |

FOREIGN PATENT DOCUMENTS

JP          9-280362         10/1997

\* cited by examiner

Primary Examiner—Sherry Estremsky
(74) Attorney, Agent, or Firm—Crowell & Moring LLP

(57) ABSTRACT

In a control unit of an automotive vehicle, it is possible to securely prevent a tie-up due to a miss-recognition of a disengage timing of a disengage side friction device, securely prevent an early disengage due to an erroneous recognition of the disengage timing and realize a control of accurately and reliably shifting the clutch. Accordingly, a control unit of an automatic transmission having pressure adjusting command generating means which executes a shift by engaging and disengaging a predetermined friction device in an automatic transmission connected to an engine and adjusts a hydraulic pressure acting on the friction device at a time of the shift is structured such as to have disengage timing recognizing means which recognizes a disengage timing of a disengage side friction device at a time of shifting the automatic transmission, first disengage determining means which determines a disengage operation of the disengage side friction device on the basis of a result of recognition by the disengage timing recognizing means and second disengage determining means which forcibly determines a disengage operation of the disengage side friction device in the case that it is impossible to recognize the disengage timing in the disengage timing recognizing means. In this control unit, the pressure adjusting command generating means operates so as to disengage the disengage side friction device on the basis of determination of the first and second disengage determining means.

6 Claims, 13 Drawing Sheets

| SHIFT STAGE | FRICTION DEVICE | | | | |
|---|---|---|---|---|---|
| | L/C | 2&4/B | H/C | L&R/B | L/OWC |
| FIRST SPEED | ○ | × | × | × | ○ |
| SECOND SPEED | ○ | ○ | × | × | × |
| THIRD SPEED | ○ | × | ○ | × | × |
| FOURTH SPEED | × | ○ | ○ | × | × |
| BACKWARD MOVEMENT | × | × | × | ○ | × |

CONTROL UNIT AND CONTROL METHOD OF AUTOMATIC TRANSMISSION AND AUTOMOTIVE VEHICLE

This application is a continuation-in-part of Ser. No. 09/447,358, filed Nov. 22, 1999, now U.S. Pat. No. 6,183,395, issued Feb. 6, 2001.

BACKGROUND OF THE INVENTION

FIELD OF THE INVENTION

The present invention relates to a control unit and a control method of an automatic transmission for controlling a hydraulic pressure used for a shift in the automatic transmission of an automotive vehicle, and an automotive vehicle having the control unit mounted thereon.

As this kind of control method in accordance with the prior art, for example, there is a structure described in Japanese Patent Unexamined Publication No. 9-280362. This conventional control method is structured such as to at first start an engagement of a fixed side friction device when a shift command signal is generated and next start a disengage of a disengage side friction device when recognizing a disengage timing of the disengage side friction device. Further, the disengage timing of the disengage side friction device is recognized by detecting a torque phase on the basis of a longitudinal acceleration signal of a vehicle. Here, the torque phase means a period at which a number of rotation of a turbine is not reduced and only a torque of an output shaft in the transmission is changed in the case of paying attention to a time change of the torque of the output shaft in the transmission. Further, when recognizing a disengage timing (a torque phase) of the disengage side friction device on the basis of the longitudinal acceleration signal of the vehicle, an elapsed time after the shift command signal is generated is measured, the elapsed time when the disengage timing is recognized is compared with a predetermined elapsed time and a disengage of the disengage side friction device is started for the first time when the former elapsed time is greater than the latter elapsed time, whereby an early disengage due to an erroneous recognition of the disengage timing during a rough road travelling or the like is prevented and a blowing-up of a number of rotation of the turbine is prevented.

In accordance with the control method described in Japanese Patent Unexamined Publication No. 9-280362, as mentioned above, since the disengage side friction device is disengaged for the first time when the elapsed time at which the disengage time is recognized becomes greater than the predetermined elapsed time, it is possible to prevent an early disengage due to an erroneous recognition of the disengage timing during the rough road travelling. However, in accordance with the control method described in Japanese Patent Unexamined Publication No. 9-280362, in the case that the disengage timing can not be recognized due to the rough road travelling, both of the fixed side friction device and the disengage side friction device are fixed (tied up), so that there is generated a problem that not only the shift characteristic is deteriorated but also the friction device (a clutch) is promoted to be broken.

SUMMARY OF THE INVENTION

A first object of the present invention is to provide a control unit and a control method of an automotive vehicle which securely prevent a tie-up due to a miss-recognition of the disengage timing of the disengage side friction device and realize a control of accurately and reliably shifting the clutch, and an automotive vehicle having the control unit mounted thereon.

A second object of the present invention is to provide a control unit and a control method of an automotive vehicle which securely prevent an early disengage and a tie-up due to an erroneous recognition and a miss-recognition of the disengage timing of the disengage side friction device and realize a control of accurately and reliably shifting the clutch.

(1) In order to achieve the first object mentioned above, in accordance with the present invention, there is provided a control unit of an automatic transmission having pressure adjusting command generating means which executes a shift by engaging and disengaging a predetermined friction device in an automatic transmission connected to an engine and adjusts a hydraulic pressure acting on the friction device at a time of the shift, comprising:

disengage timing recognizing means which recognizes a disengage timing of a disengage side friction device at a time of shifting the automatic transmission;

first disengage determining means which determines a disengage operation of the disengage side friction device on the basis of a result of recognition by the disengage timing recognizing means; and second disengage determining means which forcibly determines a disengage operation of the disengage side friction device in the case that it is impossible to recognize the disengage timing in the disengage timing recognizing means, wherein the pressure adjusting command generating means operates so as to disengage the disengage side friction device on the basis of determination of the first and second disengage determining means.

As mentioned above, the second disengage determining means is provided in addition to the first disengage determining means so as to forcibly determine the disengage operation of the disengage side friction device in the case that the disengage timing of the disengage side friction device can not be recognized in the disengage timing recognizing means, whereby the tie-up due to the miss-recognition of the disengage timing is securely prevented by forcibly disengaging the friction device even in the case that the disengage timing can not recognized, for example, due to the rough road travelling or the like, and an accurate and reliable clutch shifting control can be realized.

(2) Further, in order to achieve the second object mentioned above, in accordance with the present invention, there is provided a control unit of an automatic transmission having pressure adjusting command generating means which executes a shift by engaging and disengaging a predetermined friction device in an automatic transmission connected to an engine and adjusts a hydraulic pressure acting on the friction device at a time of the shift, comprising:

disengage timing recognizing means which recognizes a disengage timing of a disengage side friction device at a time of shifting the automatic transmission;

first disengage determining means which determines a disengage operation of the disengage side friction device on the basis of a result of recognition by the disengage timing recognizing means; and second disengage determining means which forcibly determines a disengage operation of the disengage side friction device in the case that it is impossible to recognize the disengage timing in the disengage timing recognizing means, wherein the pressure adjusting command generating means operates so as to disengage the disengage side friction device on the basis of determination of the first and second disengage determining means, and there is further provided disengage inhibiting means for inhibiting a disengage of the disengage side friction device for a predetermined period after the automatic transmission starts shifting.

As mentioned above, since the second disengage determining means is provided in addition to the first disengage determining means, the tie-up due to the miss-recognition of the disengage timing is securely prevented as mentioned in the item (1) mentioned above. Further, since the disengage inhibiting means is provided so as to inhibit to disengage the disengage side friction device for a predetermined period after the automatic transmission starts shifting, an early disengage is securely prevented even in the case that the disengage timing is erroneously recognized, for example, due to the rough road travelling or the like, and an accurate and reliable clutch shifting control can be realized.

(3) Further, in order to achieve the first object mentioned above, in accordance with the present invention, there is provided a control method of an automatic transmission having pressure adjusting command generating means which executes a shift by engaging and disengaging a predetermined friction device in an automatic transmission connected to an engine and adjusts a hydraulic pressure acting on the friction device at a time of the shift, comprising the steps of:

recognizing a disengage timing of a disengage side friction device at a time of shifting the automatic transmission;

determining a disengage operation of the disengage side friction device on the basis of the recognized result;

forcibly determining a disengage operation of the disengage side friction device in the case that it is impossible to recognize the disengage timing; and operating the pressure adjusting command generating means so as to disengage the disengage side friction device on the basis of these determinations.

Accordingly, the tie-up due to the miss-recognition of the disengage timing is securely prevented as mentioned in the item (1) mentioned above, and an accurate and reliable clutch shifting control can be realized.

(4) Further, in order to achieve the second object mentioned above, in accordance with the present invention, there is provided a control method of an automatic transmission having pressure adjusting command generating means which executes a shift by engaging and disengaging a predetermined friction device in an automatic transmission connected to an engine and adjusts a hydraulic pressure acting on the friction device at a time of the shift, comprising the steps of:

recognizing a disengage timing of a disengage side friction device at a time of shifting the automatic transmission;

determining a disengage operation of the disengage side friction device on the basis of the recognized result;

forcibly determining a disengage operation of the disengage side friction device in the case that it is impossible to recognize the disengage timing;

operating the pressure adjusting command generating means so as to disengage the disengage side friction device on the basis of these determinations; and inhibiting a disengage of the disengage side friction device for a predetermined period after the automatic transmission starts shifting.

Accordingly, the tie-up due to the miss-recognition of the disengage timing and the early disengage due to the erroneous recognition of the-disengage timing are securely prevented as mentioned in the item (2) mentioned above, and an accurate and reliable clutch shifting control can be realized.

(5) In order to achieve the first object mentioned above, in accordance with the present invention, there is provided an automotive vehicle to which a control unit of an automatic transmission is mounted, the control unit of the automatic transmission having pressure adjusting command generating means which executes a shift by engaging and disengaging a predetermined friction device in an automatic transmission connected to an engine and adjusts a hydraulic pressure acting on the friction device at a time of the shift, comprising:

disengage timing recognizing means which recognizes a disengage timing of a disengage side friction device at a time of shifting the automatic transmission;

first disengage determining means which determines a disengage operation of the disengage side friction device on the basis of a result of recognition by the disengage timing recognizing means; and second disengage determining means which forcibly determines a disengage operation of the disengage side friction device in the case that it is impossible to recognize the disengage timing in the disengage timing recognizing means, wherein the pressure adjusting command generating means operates so as to disengage the disengage side friction device on the basis of determination of the first and second disengage determining means.

Accordingly, there can be provided the automotive vehicle to which the control unit of the automatic transmission is mounted, the control unit of the automatic transmission being structured such as to securely prevent the tie-up due to the miss-recognition of the disengage timing as mentioned in the item (1) mentioned above, and realize an accurate and reliable clutch shifting control.

DESCRIPTION OF THE PREFERRED EMBODIMENTS

Embodiments in accordance with the present invention will be in detail described below with reference to the accompanying drawings.

Figure 1:
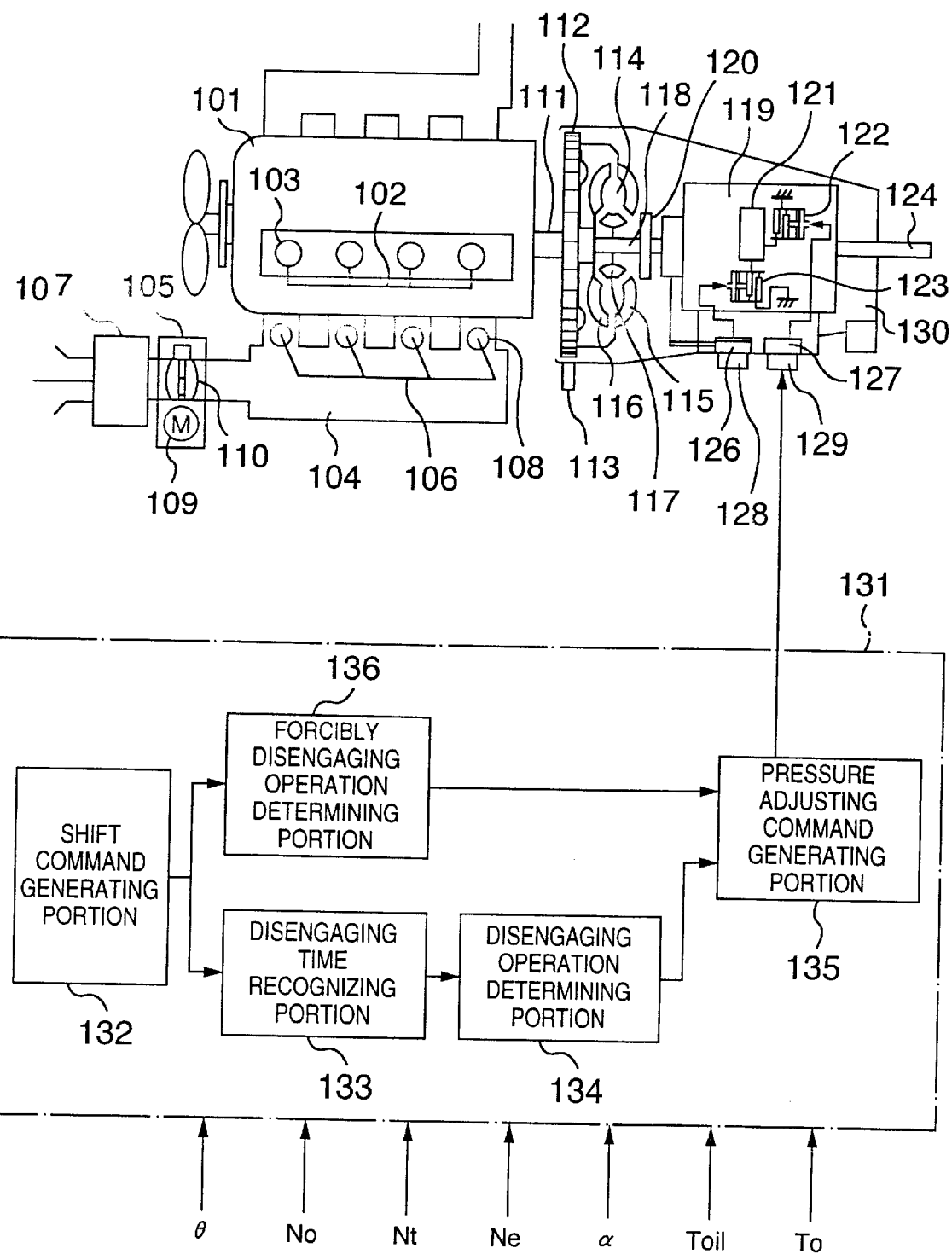
FIG. 1 is an idiomatic view which shows a structure of an automatic transmission provided with a control unit in accordance with a first embodiment of the present invention.

FIG. 1 is an idiomatic view of a structure of an automatic transmission provided with a control unit in accordance with a first embodiment of the present invention. In FIG. 1, reference numeral 101 denotes an engine, and the engine 101 is a four cylinder engine in the present embodiment. An ignition device 102 is provided in the engine 101. The ignition device 102 has four ignition plugs 103 corresponding to a number of the cylinders in the engine 101. An electronically controlled throttle 105 for adjusting a flow amount of an air passing through a suction pipe 104, a fuel injection device 106 for injecting a fuel and an air flow meter 107 are provided in the suction pipe 104 which is used for sucking the air to the engine 101. The fuel injection device 106 has four fuel injection valves 108 in correspondence to the number of the cylinders in the engine 101. The electronically controlled throttle 105 is structured such that an actuator 109 drives a throttle valve 110 so as to control an air flow amount. Further, in a normal automotive vehicle, the throttle valve 110 and an acceleration pedal (not shown) are connected to each other by a mechanical wire (not shown) and are operated one to one.

A fly wheel 112 is mounted to a crank shaft 111 of the engine 101. An engine rotational number sensor 113 for detecting a number of rotation of the crank shaft 111, that is, a number Ne of rotation of an engine is mounted to the fly wheel 112. A torque converter 114 is directly connected to the fly wheel 112, a stepped variable speed gear mechanism 119 is directly connected to a torque converter output shaft 118, and an automatic transmission 130 is constituted by the torque converter output shaft 118 and the stepped variable speed gear mechanism 119.

The torque converter 114 is constituted by a pump 115, a turbine 116 and a stator 117. An output shaft of the turbine 116, that is, the torque converter output shaft 118 is directly connected to the stepped variable speed gear mechanism 119. Further, a turbine rotation sensor 120 for measuring a number Nt of rotation of the turbine is mounted to the torque converter output shaft 118.

A structure of the variable speed gear mechanism 119 is known, includes two planetary gears and five frictional engaging apparatuses and is structured such that a gear ratio or a direction of rotation of the planetary gears is changed by selectively connecting or disengaging five frictional engaging apparatuses so as to shift or switch between a forward movement and a backward movement. In FIG. 1, for reasons of convenience for explanation, these elements are represented by a planetary gear 121 and friction devices 122 and 123. The friction devices 122 and 123 are respectively controlled by spools 126 and 127 and linear solenoids 128 and 129 (a pressure adjusting apparatus). Further, the variable speed gear mechanism 119 is connected to an output shaft 124 and the output shaft 124 is connected to a propeller shaft (not shown) of an automotive vehicle.

Various kinds of actuators for driving the engine 101 and an automatic transmission 130 mentioned above are controlled by a controller 131. A throttle valve opening θ, a number No of rotation (vehicle speed) of the output shaft of the transmission, a number Nt of rotation of the turbine, a number Ne of rotation of the engine, a temperature Toil of an oil in the transmission, a pedaling amount α of the accelerator pedal and the like are input to the controller 131 and used for a control. Further, in a special system, a torque To of the output shaft of the transmission detected by using a torque sensor (not shown) mounted to the output shaft 124 of the automatic transmission 130 is taken into the controller 131.

Figures 2, 3:
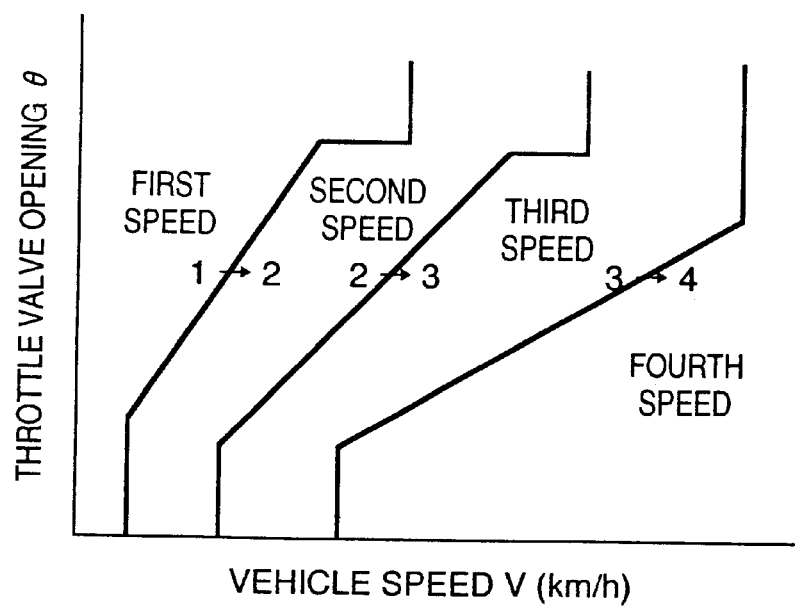
FIG. 2 is a shift diagram at a shift-up time in the case that the automatic transmission is a four-speed automatic transmission.
FIG. 3 is a view which shows a relation between an engagement and disengage of five friction devices in a transmission mechanism and a shift stage.

FIG. 2 is a shift diagram at a shift-up time in the case that the automatic transmission 130 is a four speed automatic transmission. The controller 131 judges a shift on the basis of an amount indicating a load of the engine, for example, the throttle valve opening θ and an actual vehicle speed V, as shown in FIG. 2, and determines a shifting stage of the automatic transmission 130.

FIG. 3 is a table which shows a relation between engagement and disengaging operations and shift gears in five friction devices of the variable speed gear mechanism 119. The automatic transmission 130 is provided with a low clutch (L/C), a 24 brake (2&4/B), a high clutch (H/C), a low reverse brake (L&R/B) and a low one-way clutch (L/OWC) as five friction device, and selectively fix (symbol ○ in the drawing) or disengage (symbol×in the drawing) them as shown in FIG. 3, whereby forward movement 1 to 4 stages and a backward movement stage can be selected. For example, in a 2–3 shift, a shift is established by fixing the high clutch (H/C) and disengaging the 24 brake (2&4/B). In the following description, a fixed side friction device (a friction device which is currently under a disengaged condition and will be fixed for shifting) is represented by the friction device 123 in FIG. 1, and a disengaged side friction device (a friction device which is currently under a fixed condition and will be disengaged for shifting) is represented by the friction device 122 in FIG. 1.

A control unit in accordance with the present embodiment is provided in the automatic transmission mentioned above. The control unit is constituted by the controller 131 shown in FIG. 1. That is, the controller 131 has processing functions of a shift command generating portion 132, a disengaging time recognizing portion 133, a disengaging operation determining portion 134, a pressure adjusting command generating portion 135 and a forcibly disengaging operation determining portion 136 as the control unit in accordance with the present embodiment.

In the shift command generating portion 132 judges on the basis of the throttle valve opening θ and the number No of rotation of the output shaft in the transmission (vehicle speed), as shown in FIG. 2, whether or not a state to be shifted is established, and when the state to be shifted is established, it generates the shift command signal.

The disengaging time recognizing portion 133 recognizes a disengaging time of the disengaged side friction device (the friction device currently under the fixed state) among the friction devices 122 and 123. As an example, it recognizes a torque phase at a time of shifting. As a method of recognizing the torque phase, there can be considered a method of using signals of a torque sensor (not shown) and an acceleration sensor (not shown) or a time change rate of the number No of rotation of the output shaft in the transmission.

Then, in the case of recognizing an optimum disengaging time in accordance with the method mentioned above, the disengaging operation determining portion 134 outputs a minimum value of a hydraulic pressure command value to the pressure adjusting command generating portion 135 so as to disengage the disengaged side friction device 122. Further, in the case that the disengaging time can not be recognized by the disengaging time recognizing portion 133, the forcibly disengaging operation determining portion 136 outputs a minimum value of the hydraulic pressure command value to the pressure adjusting command generating portion 135 so as to forcibly execute a clutch disengaging operation. When the minimum value of the hydraulic pressure command value is output, the pressure adjusting command generating portion 135 drives the linear solenoid 129 in connection to the disengaged side friction device 122 so as to generate the hydraulic pressure for disengaging the clutch.

In accordance with the structure mentioned above, it is possible to securely disengage the friction device even when the optimum disengaging time can not be recognized, for example, due to the rough road travelling or the like, whereby it is possible to prevent a shift characteristic from deteriorating. Here, in the following description, the "friction device" will be properly called as a "clutch".

Figure 4:
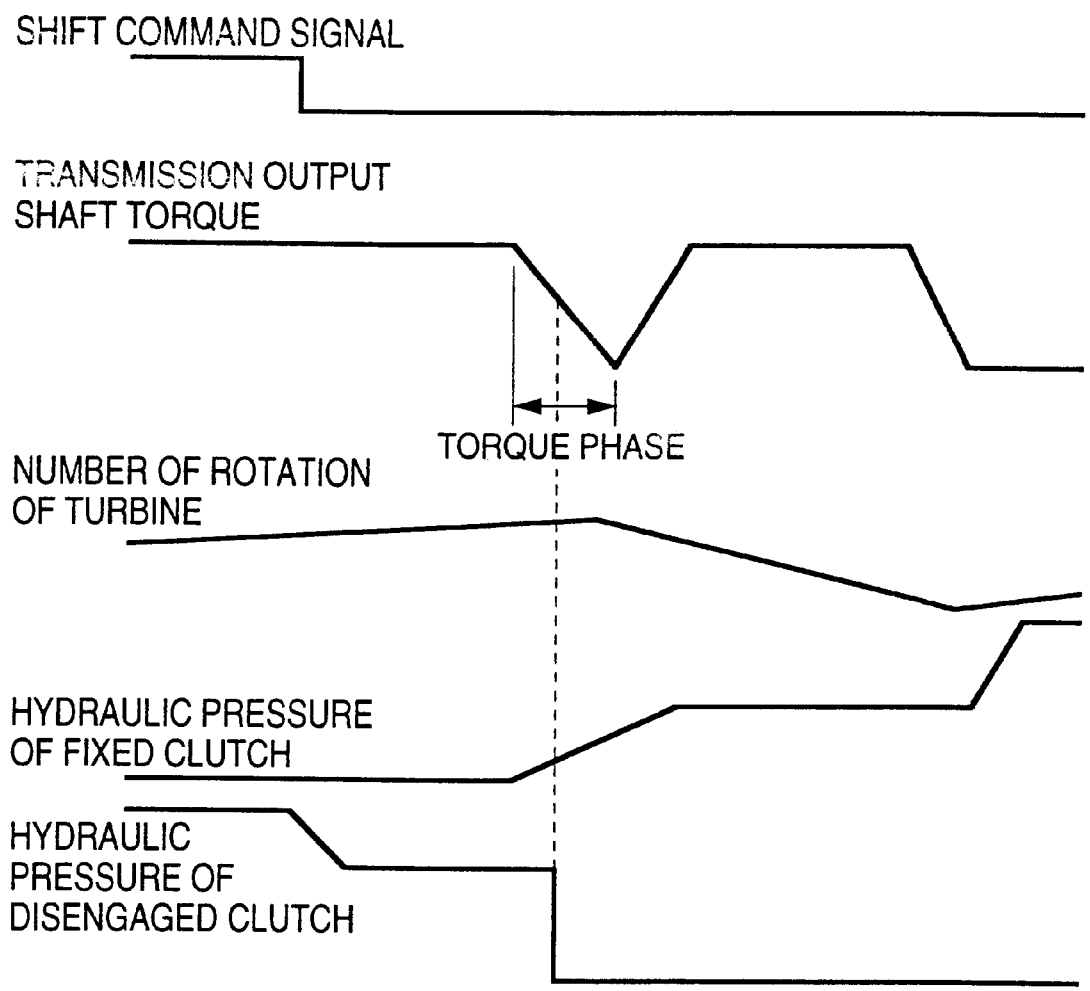
FIG. 4 is a schematic view of a shift characteristic at a shift-up time in accordance with a conventional general control method.

FIG. 4 is a schematic view of a shift characteristic at a shift up time in accordance with a conventional general control method. The shift command signal is generated and the hydraulic pressure control at a shifting time is started. The hydraulic pressure in the fixed side clutch is increased, and the output shaft torque is reduced while the number of rotation of the turbine is not reduced when a transmission of the torque is started. This is because the torque acts on both of the disengaged side clutch and the fixed side clutch under the fixed state due to beginning of the fixation of the fixed side clutch and a part of the torque is not transmitted to the output shaft 124. This area corresponds to the torque phase. At this period, when the hydraulic pressure in the disengaged side clutch is lowered at a stroke, the number of rotation of the turbine is lowered and the shift is actually started. That is, a good clutch shifting control is realized by recognizing the beginning of the torque phase so as to disengage the disengaged side clutch at a stroke. Further, the hydraulic pressure of the fixed side clutch during the shift and the hydraulic pressure of the disengaged side clutch before the torque phase is started are set to a level at which a good shift characteristic can be realized at each of operating conditions of the automatic transmission.

Figure 5:
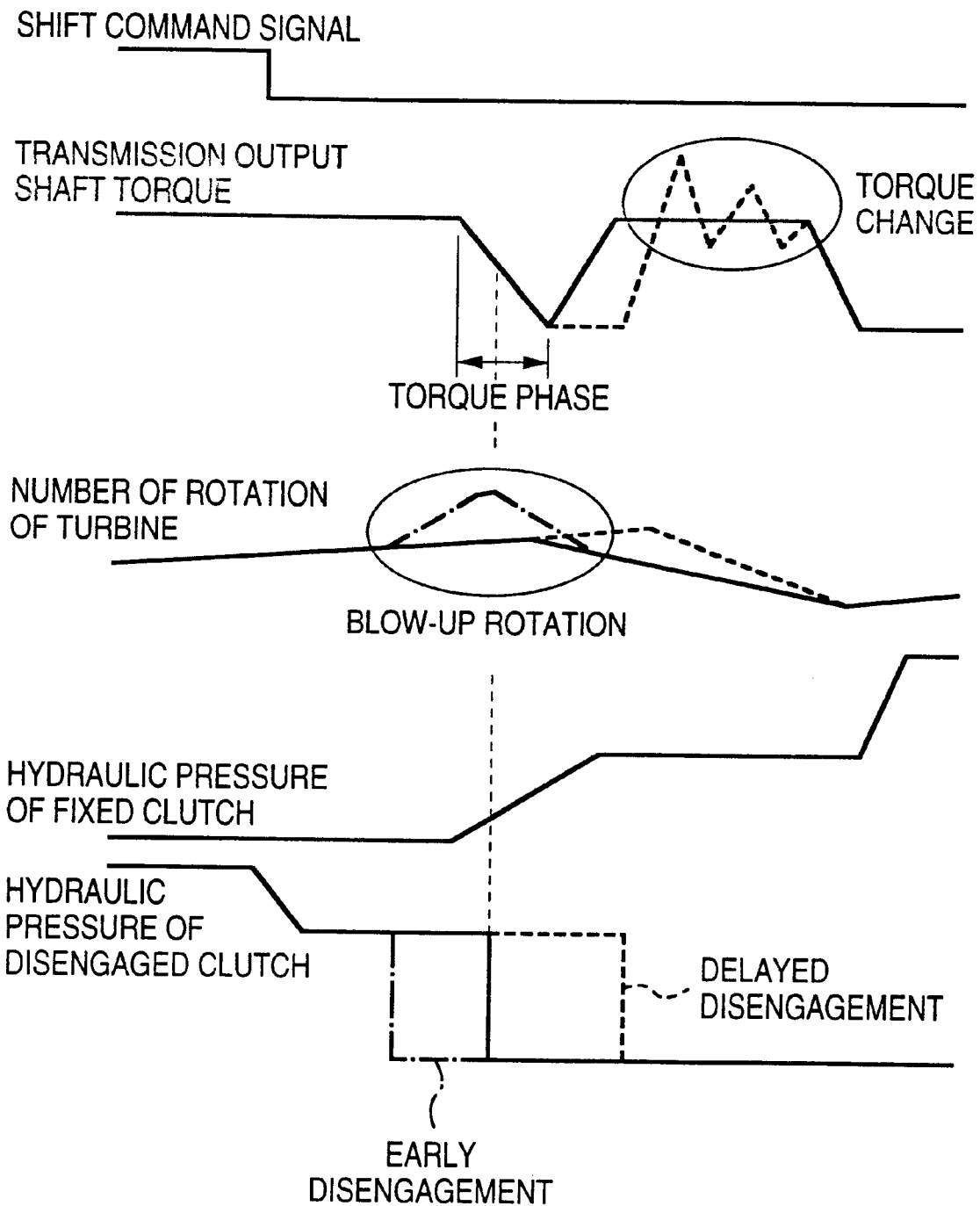
FIG. 5 is a schematic view of the shift characteristic at the shift-up time in accordance with the conventional general control method which shows an influence in the case that a clutch disengage timing is slipped.

FIG. 5 is a schematic view which shows an influence in the case that the clutch disengage timing is slipped in the shift characteristic at a shift up time in accordance with a conventional general control method. As shown by a single-dot chain line in FIG. 5, when executing a clutch disengaging operation at a period prior to a time at which a torque phase is actually started, for example, due to an erroneous recognition of the torque phase, a blowing up of the number or rotation of the turbine is generated, thereby applying a feeling of physical disorder to a driver. Further, as shown by a broken line in FIG. 5, when executing a clutch disengaging operation at a widely delayed timing after the torque phase is started, for example, due to a miss-recognition of the torque phase, there is generated a state (a tie-up state) that the torque is applied to both of the fixed and disengaged clutches, so that not only a drag of the output shaft torque and a torque change are generated but also a deterioration of the clutch is promoted. That is, it is necessary to establish a method of accurately recognizing the torque phase start timing as the disengaging timing and preventing an erroneous recognition and a miss-recognition of the recognizing method so as to obtain a high reliability.

Figure 6:
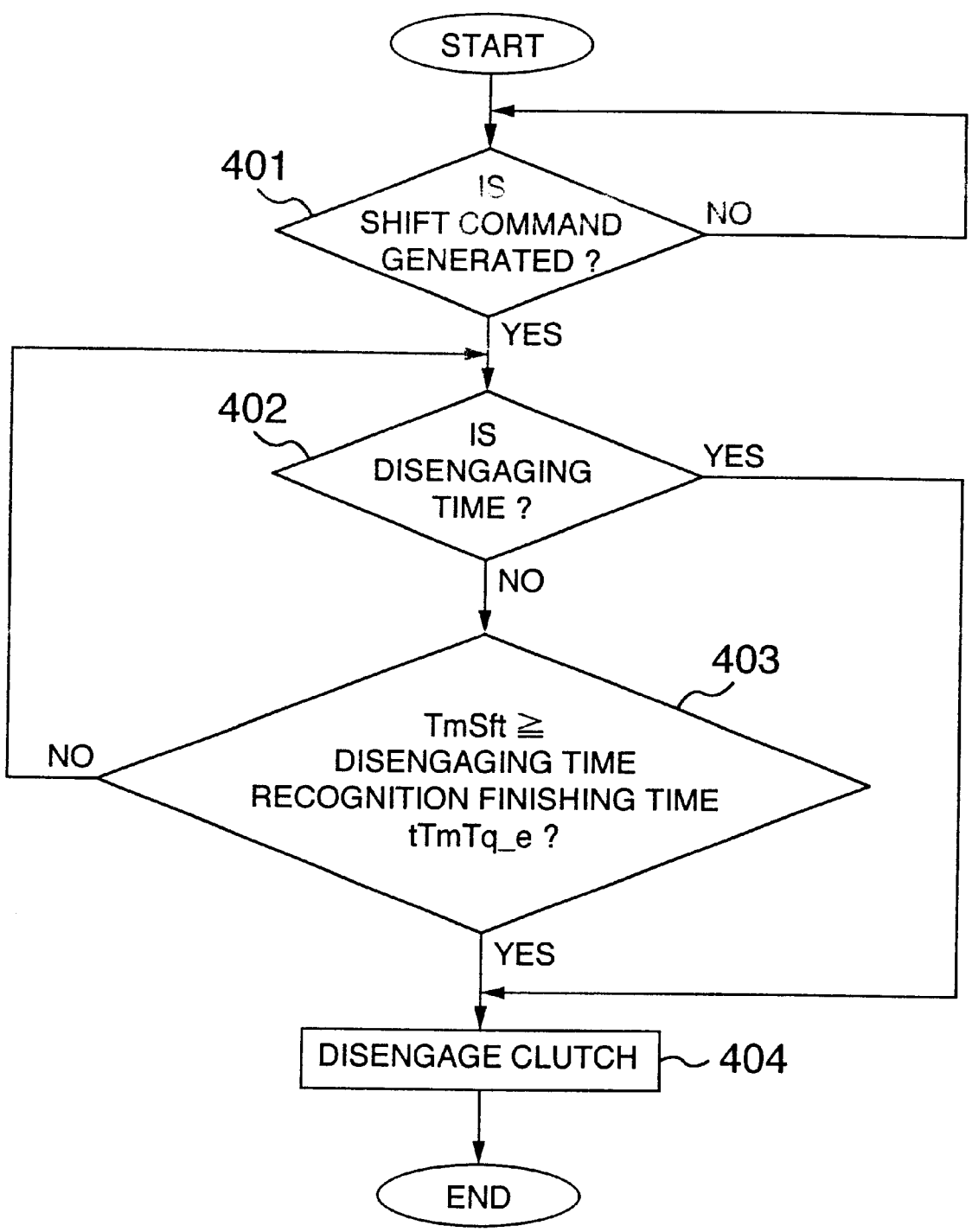
FIG. 6 is a flow chart which shows a processing function of the control unit of the automatic transmission in accordance with the first embodiment.

FIG. 6 is a flow chart which shows processing functions of the disengaging time recognizing portion 133, the disengaging operation determining portion 134, the pressure adjusting command generating portion 135 and the forcibly disengaging operation determining portion 136 in the control unit of the automatic transmission 130 in accordance with the present embodiment.

At first, in a step 401, it is judged whether or not the shift command signal is generated. When the shift command signal is generated, the step goes to a step 402, and when it is not generated, the step 401 is again executed. Next, in the step 402, it is judged by using a time change rate of the number of rotation of the transmission output shaft 124 whether or not the disengaging time is established (the disengage time recognizing portion 134 and the disengaging operation determining portion 134). In the case of recognizing as the disengaging time, the step goes to a step 404. In the case of not recognizing as the disengaging time, the step goes to a step 403. In the step 403, it is judged whether or not the value TmSft mentioned above is greater than a disengaging time recognition finishing time tTmTq-e (the forcibly disengaging operation determining portion 136). In the case that it is greater, the step goes to a step 404 for preventing the tie-up. In the case that it is smaller, the step returns to the step 402. Finally, in the step 404, the hydraulic pressure command value f the disengaged side clutch is set to a minimum value and a clutch disengaging operation is executed (the pressure adjusting command generating portion 135). By setting these processing flow, it is possible to securely prevent the miss-recognition of the disengaging time of the disengaged side friction device 122, thereby avoiding a deterioration of the shift characteristic.

Figure 7:
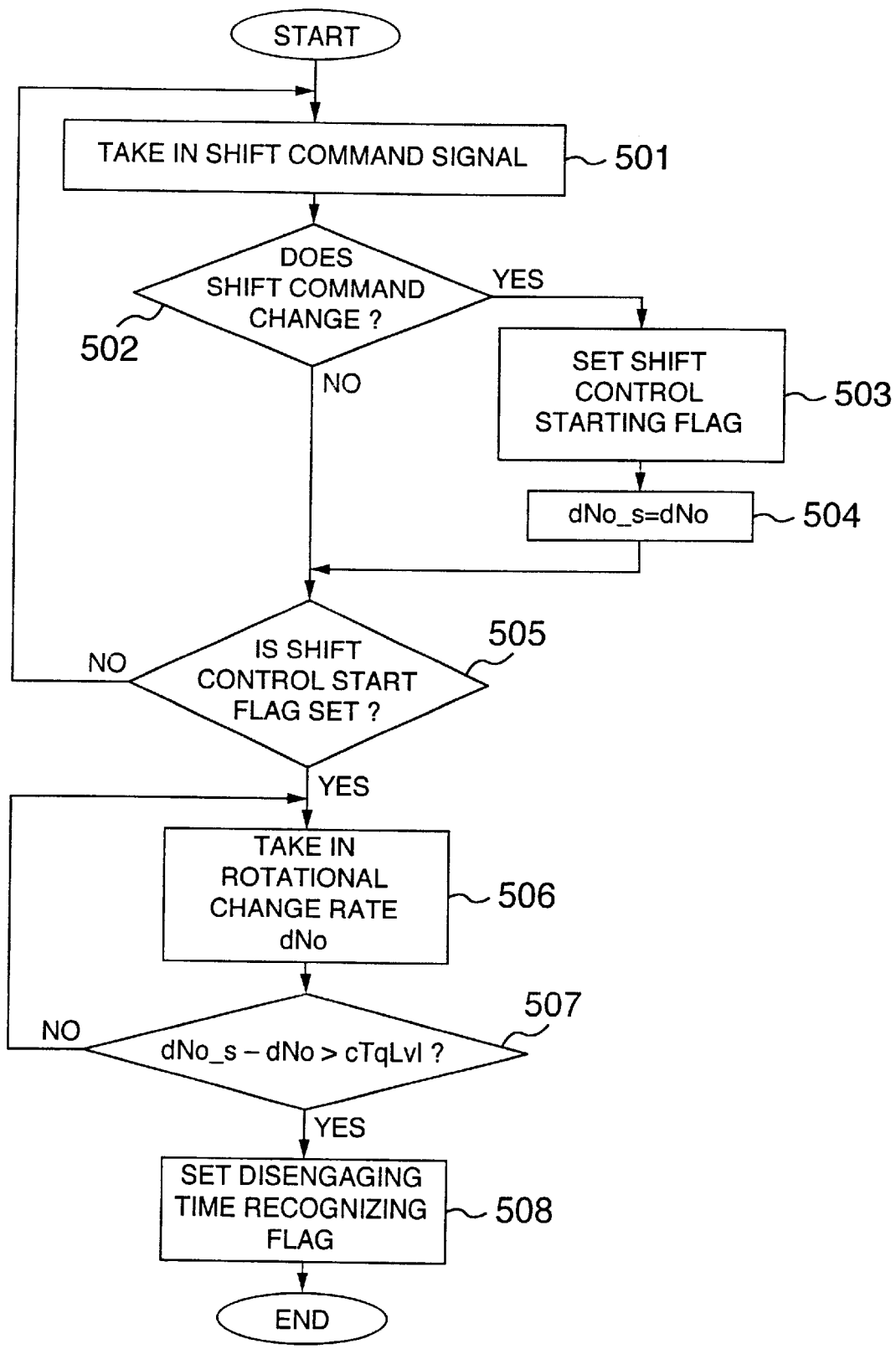
FIG. 7 is a flow chart which shows details of a process of recognizing a disengage timing.

FIG. 7 is a flow chart which shows details of the process for recognizing the disengaging time in the step 402 shown in FIG. 6. In a step 501, the shift command signal is taken in and in a step 502, it is judged whether or not the taken shift command signal changes in comparison with the preceding value. In the case that the shift command signal changes from the preceding value, a shift control start flag is set in a step 503, a value of a current number dN of rotation of the output shaft in the transmission is substituted for a reference value dNo-s in a step 504, and the step goes to a step 505. In the case that the shift command signal does not change, the step goes to the step 505 without executing the steps 503 and 504. In the step 505, it is judged whether or not the shift control start flag is set. In the case that the flag is set, the step goes to a step 506, and in the case that it is not set, the step returns to the step 501. In the step 506, the current number dNo of rotation of the output shaft in the automatic transmission is taken in. Next, in a step 507, a difference between the value dNo-s (the value dNo when the shift command is generated) and the value dNo is obtained and it is judged whether or not this value of difference is greater than a disengaging time recognizing level cTqLv1. In the case that it is greater, the step goes to a step 508 and in the case that it is smaller, the step returns to the step 506.

Finally, in the step 508, the disengaging time recognizing flag is set and the process is finished.

Figure 8:
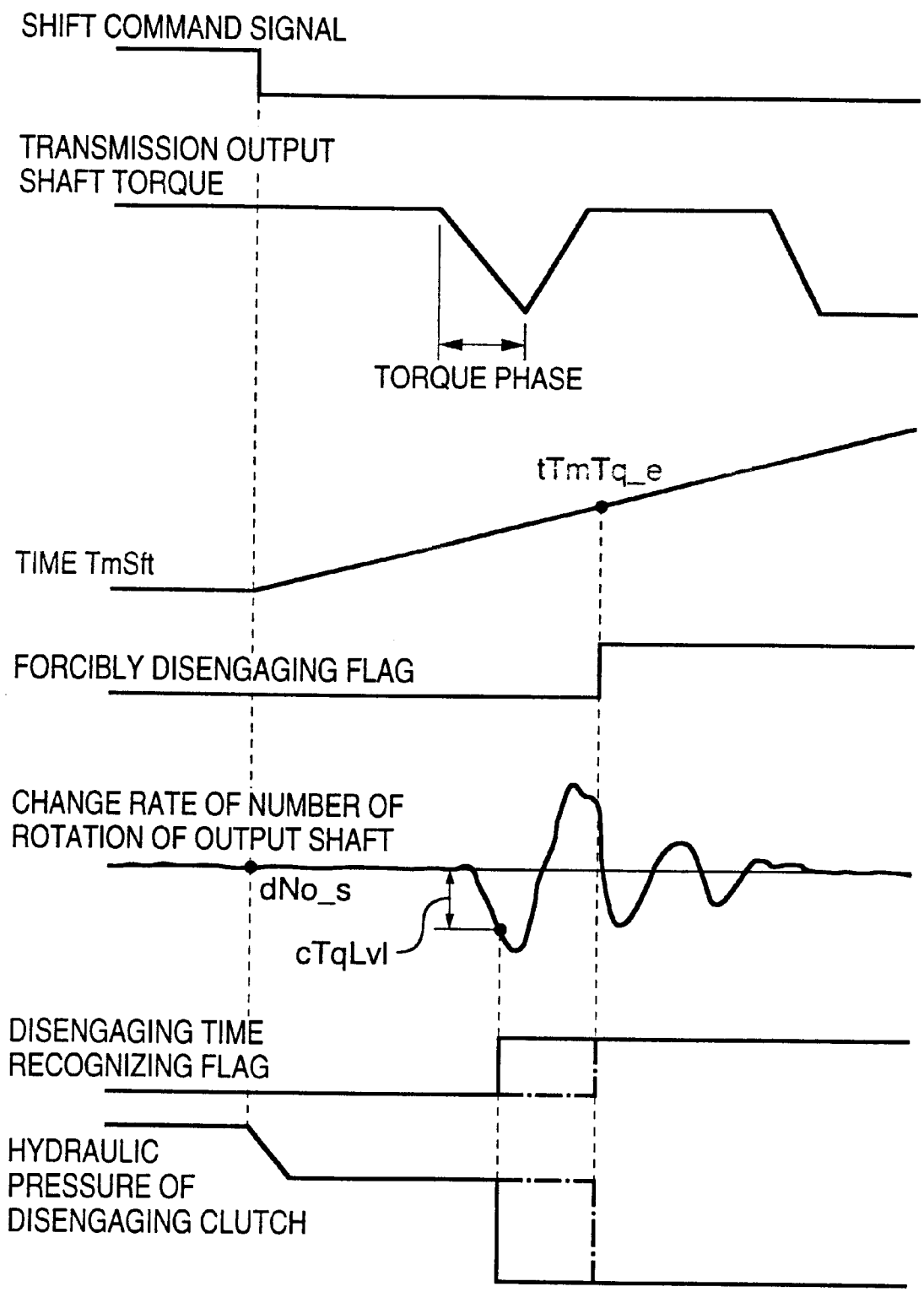
FIG. 8 is a time chart which explains an operation in accordance with the first embodiment.

FIG. 8 is a time chart which explains an operation of the present embodiment. When the shift command signal is generated, the time TmSft starts counting up. On the contrary, the number dNo of rotation of the output shaft stores a value when the shift command is generated in a memory as dNo-s. Here, an accuracy of detecting a noise and a number of rotation during the rough road travelling is bad when storing the value dNo-s, it is possible to set an average value within a fixed time after the shift command signal is generated. When the difference between the values dN0–3 and dNo becomes greater than the disengage time recognizing level cTqLv1, the disengage time recognizing flag is set. When the disengage time recognizing flag is set, the hydraulic pressure command value of the disengaged side clutch becomes the minimum value, whereby the hydraulic pressure of the disengaged side clutch is reduced. Further, when the value TmSft reaches a disengage time finishing time tTmTq-e, the forcibly disengaging flag is set. At this time, in the case that the disengage timing cannot be recognized by the changing rate of the number of rotation of the output shaft, when the forcibly disengaging flag is set as shown by a single-dot chain line in FIG. 8, the disengaging time recognizing flag is simultaneously set and the operation is performed so that the hydraulic pressure command value of the disengage side clutch becomes the minimum value. In accordance with the operation mentioned above, it is possible to securely prevent the miss-recognition of the torque phase starting time during the rough road travelling.

Figure 9:
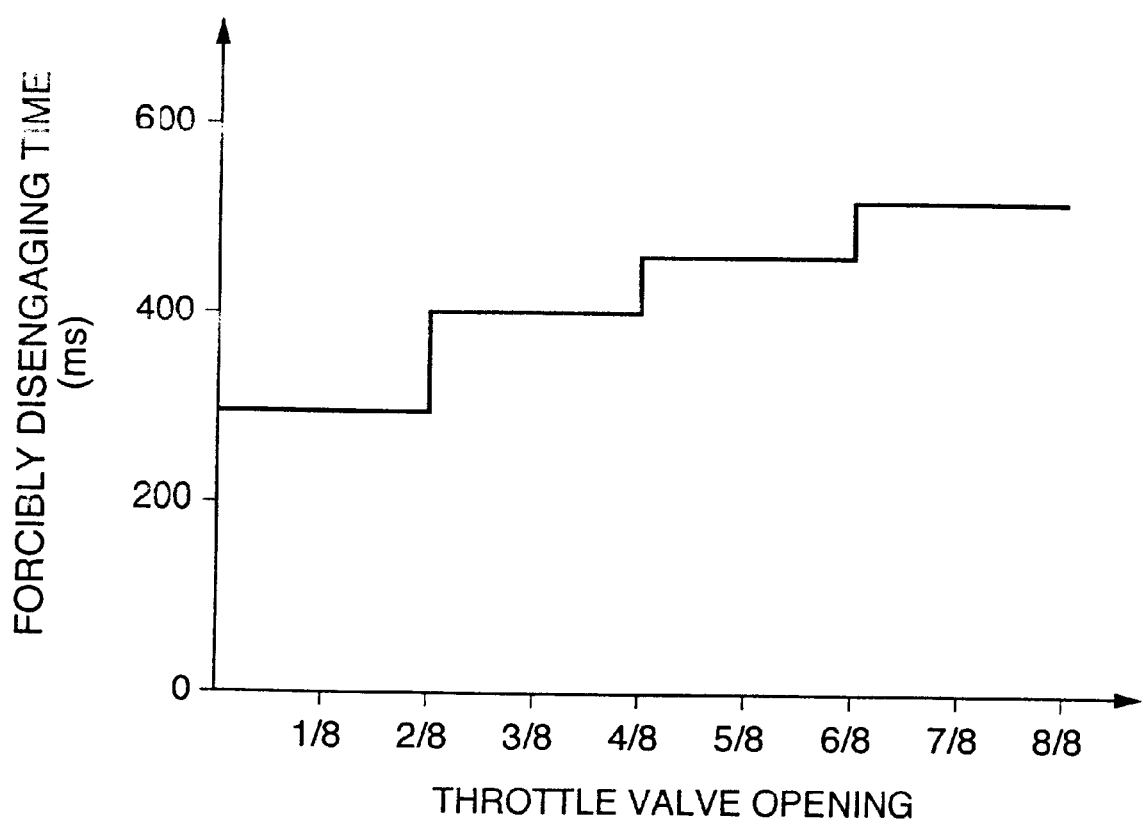
FIG. 9 is a map view of a forcible disengage setting portion provided in the control unit in accordance with the first embodiment.

FIG. 9 is an example of a map of the forcibly disengaging operation determining portion 136 shown in FIG. 1. A throttle valve opening is set to a horizontal axis and the forcibly disengaging time tTmTq-e is stored at each of the throttle valve openings. Here, an optimum disengaging time (the torque phase starting time) is dependent upon the hydraulic pressure of the clutch-to be fixed. When disengaging the clutch after exceeding the disengaging time, a torque change (a longitudinal acceleration of the vehicle) shown by a broken line in FIG. 5 is generated. This torque change becomes greater as the exceeding time is longer, and apply a feeling of physical disorder to the driver as a shift shock. Then, the shift is executed at each of the throttle valve openings so as to previously determine a limit time so that the torque change is 0.2 G or less in accordance with a tuning and store it as the map data.

Figure 10:
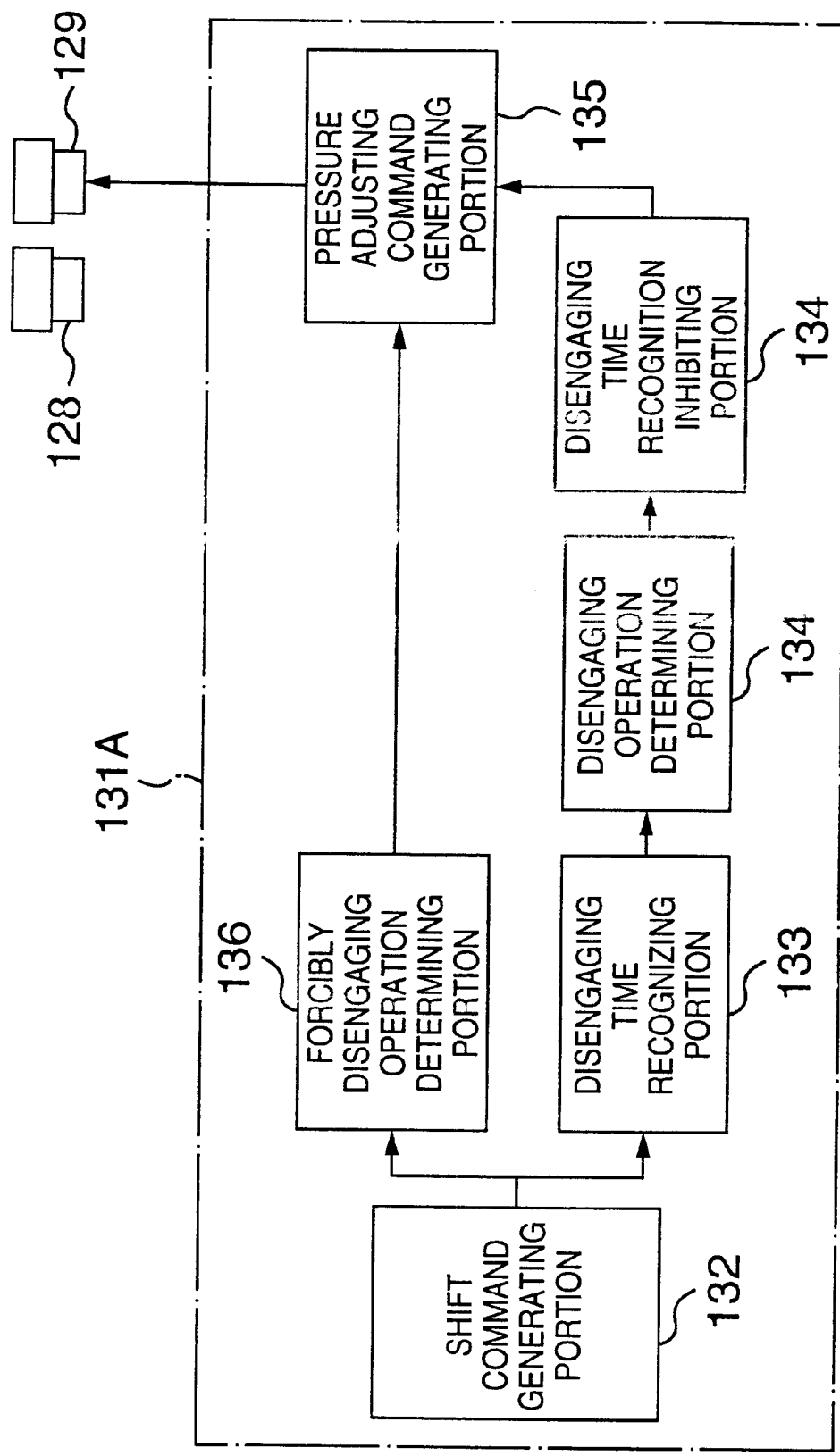
FIG. 10 is an idiomatic view which shows a structure of an automatic transmission provided with a control unit in accordance with a second embodiment of the present invention.
Figure 11:
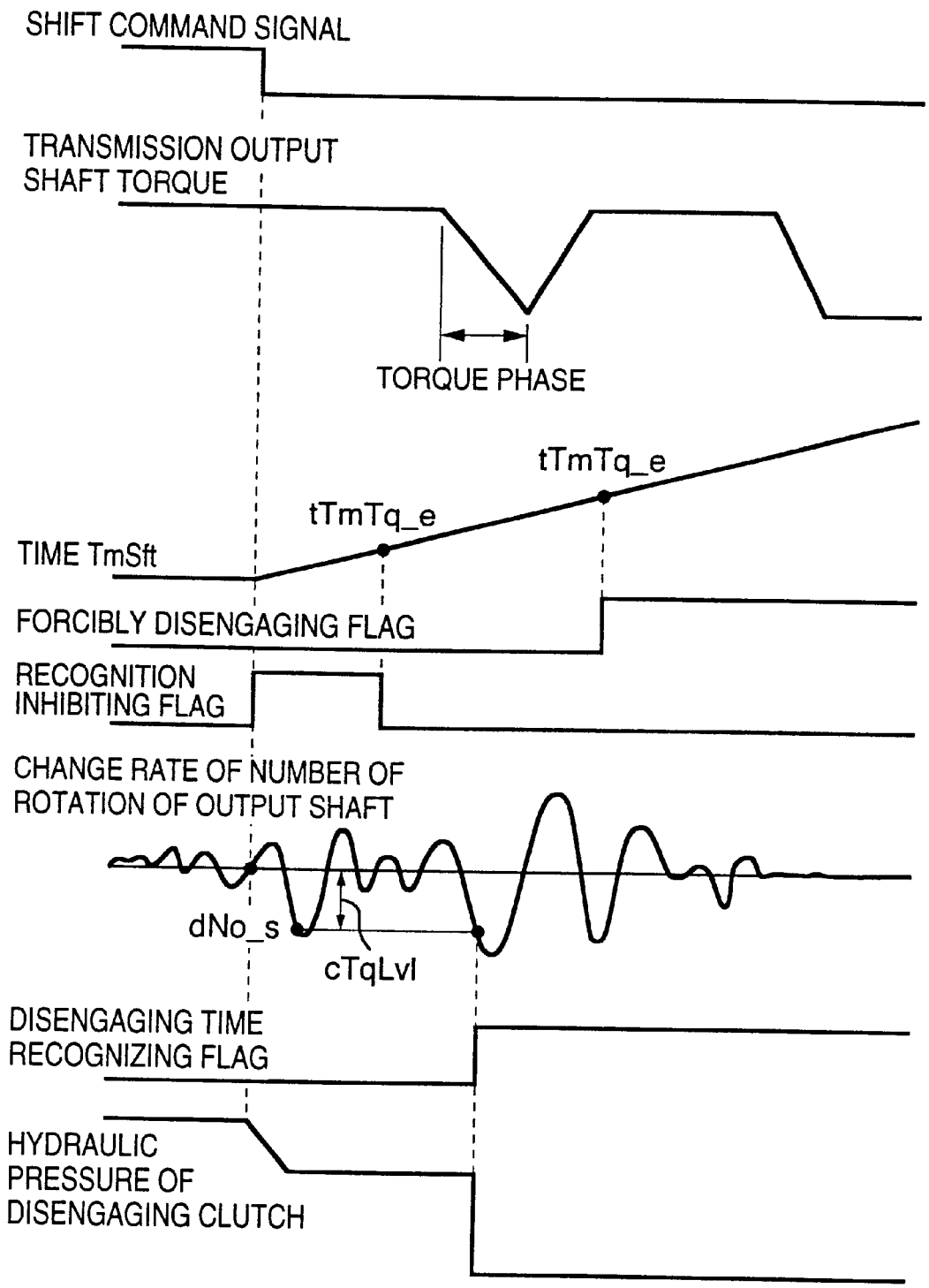
FIG. 11 is a time chart which explains an operation in accordance with the second embodiment.
Figure 12:
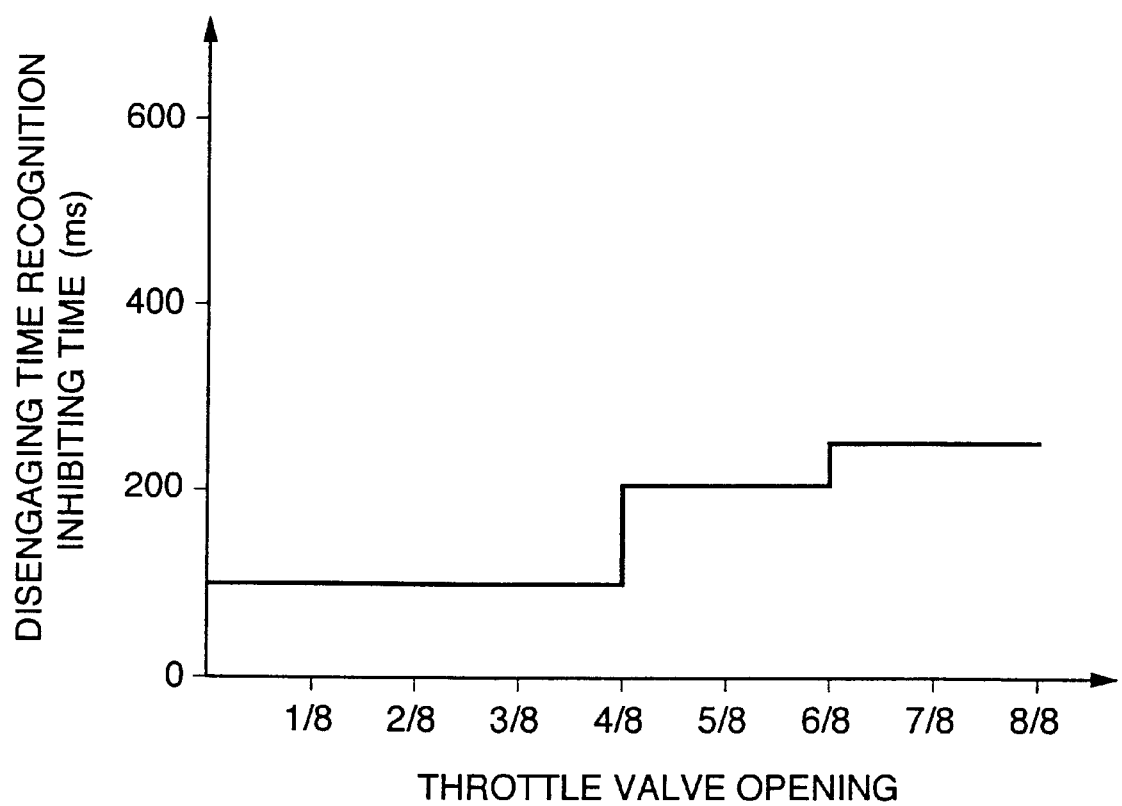
FIG. 12 is a map view of a disengage timing recognition inhibiting portion provided in the control unit in accordance with the second embodiment.

FIGS. 10 to 12 show a second embodiment in accordance with the present invention. FIG. 10 is an idiomatic view of a structure of a control unit in an automatic transmission as well as FIG. 1, however, the engine 101 and the automatic transmission 130 in FIG. 1 are omitted. Further, a controller is denoted by reference numeral 131A.

In FIG. 10, the controller 131A has processing functions of the shift command generating portion 132, the disengaging time recognizing portion 133, the disengaging operation determining portion 134, a disengaging time recognition inhibiting portion 201, the pressure adjusting command generating portion 135 and the forcibly disengaging operation determining portion 136 as the control unit of the automatic transmission in accordance with the present embodiment.

In the shift command generating portion 132 generates the shift command signal on the basis of the throttle valve opening θ and the number of rotation of the output shaft of the transmission (the vehicle speed). The disengaging time recognizing portion 133 recognizes a disengaging time of the disengaged side friction device. In the case of recognizing the disengage time, the disengaging operation determining portion 134 outputs the minimum value of the hydraulic pressure command value to the pressure adjusting command generating portion 135 so as to disengage the disengaged side friction device.

Here, in the case that the recognition is inhibited by the disengaging time recognition inhibiting portion 201, the disengaging operation command signal of the disengaging operation determining portion 134 is ignored. Then, in the case that the disengaging time can not be recognized by the disengaging time recognizing portion 133, the minimum value of the hydraulic pressure command value is output to the pressure adjusting command generating portion 135 so that the clutch disengaging operation is forcibly executed by the forcibly disengaging operation determining portion 136.

In accordance with the structure mentioned above, in the same manner as that of the first embodiment, it is possible to securely disengage the friction device even in the case that the optimum disengaging time can not be recognized, for example, due to the rough road travelling so as to prevent the shift characteristic from deteriorating, and further, it is possible to solve the problem that the optimum disengaging time is erroneously recognized, for example, due to the rough road travelling or the like and the early disengaging operation is executed.

FIG. 11 is a time chart which explains an operation of the second embodiment. When the shift command signal is generated, the time TmSft starts counting up and a recognition inhibiting flag is set. On the contrary, the number dNo of rotation of the output shaft stores a value when the shift command is generated in a memory as dNo-s. Here, an accuracy of detecting a noise and a number of rotation during the rough road travelling is bad when storing the value dNo-s, it is possible to set an average value within a fixed time after the shift command signal s generated. When the difference between the values dNO-s and dNo becomes greater than the disengage time recognizing level cTqLv1, the disengage time recognizing flag is set. Here, as shown in FIG. 11, even when the difference mentioned above becomes greater than the level mentioned above while the recognition inhibiting flag is set, the disengage time recognizing flag is not set as an erroneous recognition of the disengaging time. When the value TmSft becomes more than a disengaging time recognition inhibiting time tTmTq-s, the forcible flag mentioned above is reset and the disengaging time recognition becomes effective at the dNo signal mentioned above. In accordance with the operation mentioned above, it is possible to securely prevent the erroneous recognition of the torque phase starting time during the rough road travelling and prevent the number of rotation from blowing up due to the early disengaging operation.

FIG. 12 is an example of a map of the disengaging time recognition inhibiting portion 201 shown in FIG. 10. A throttle valve opening is set to a horizontal axis and the disengaging time recognition inhibiting time tTmTq-s is stored at each of the throttle valve openings. Here, as mentioned above, an optimum disengaging time (the torque phase starting time) is dependent upon the hydraulic pressure of the clutch to be fixed. When disengaging the clutch before the disengaging time, a blowing-up of the number of rotation shown by a single-dot chain line in FIG. 5 is generated and applies a feeling of physical disorder to the driver. Then, the shift is executed at each of the throttle valve openings so as to previously determine a time so that the blowing-up of the number of rotation is not generated in accordance with a tuning and store it as the map data.

As mentioned above, in accordance with a combination of the method of recognizing the disengaging time and the method of preventing the erroneous recognition or the miss-recognition due to the former method, a reliable clutch shifting control can be realized, so that it is possible to prevent the shift characteristic from deteriorating and the clutch from deteriorating.

Figure 13:
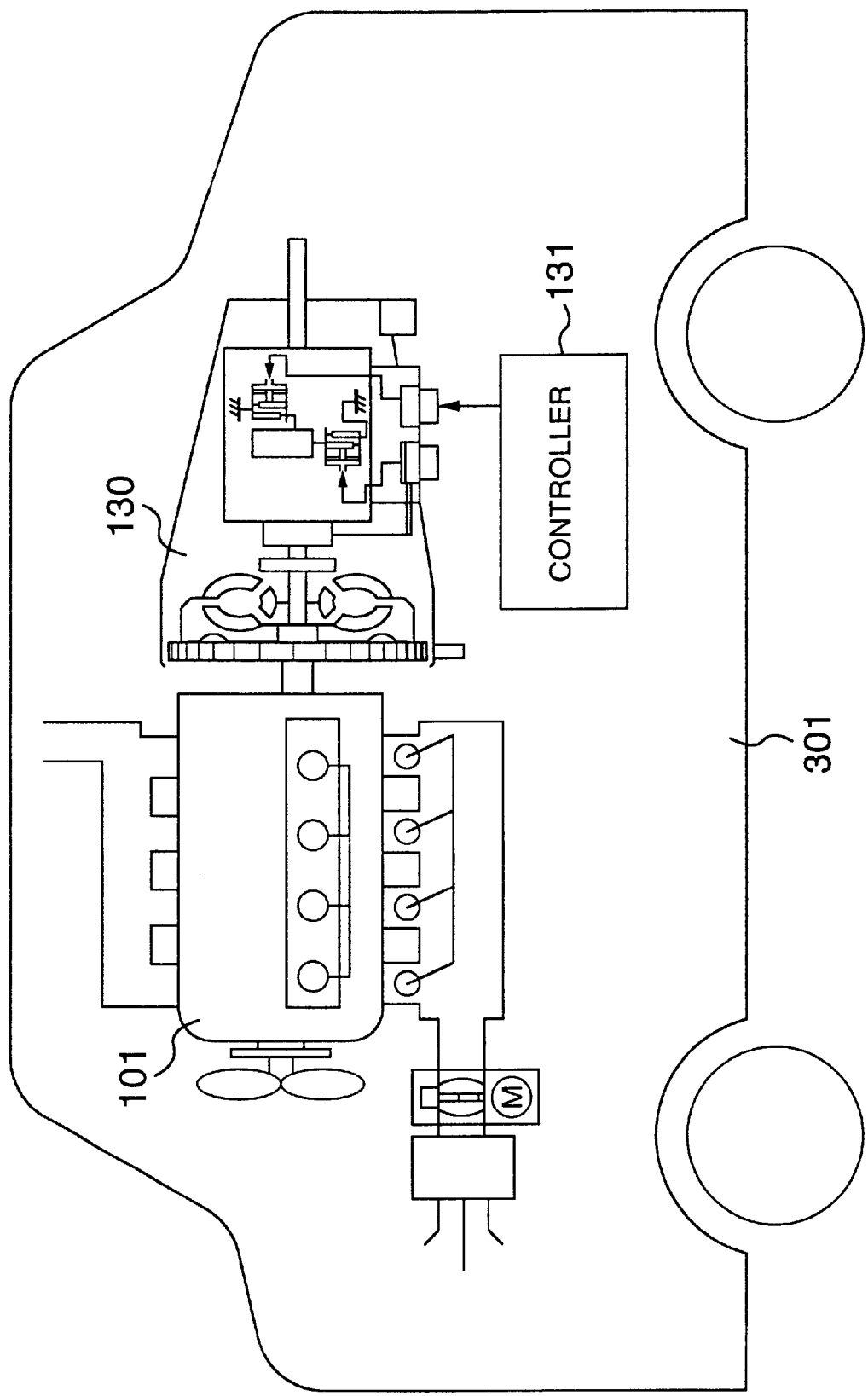
FIG. 13 is an idiomatic view which shows a structure of an automotive vehicle in accordance with a third embodiment of the present invention.

FIG. 13 shows a third embodiment in accordance with the present invention. FIG. 13 is an idiomatic view of a structure of an automotive vehicle in accordance with the present invention, however, the contents of the controller 131 (or 131A) in FIG. 13 are the same as those shown in FIG. 1 or 10, and are omitted. The engine 101, the automatic transmission 130 and the controller 131 (or 131A) mentioned above are mounted to an automotive vehicle 301 in accordance with the present invention. The automotive vehicle 301 is structured such that the shift characteristic is not deteriorated and a comfortable shift feeling can be always obtained because the disengaging time of the disengaged side friction device is optimally controlled by the controller 131 (or 131A) mentioned above.

In accordance with the present invention, in the automatic transmission which executes the shift by engaging or disengaging a predetermined friction device, it is possible to securely prevent a tie-up due to a miss-recognition of the disengage timing of the disengage side friction device and always realize a control of accurately and reliably shifting the clutch at an optimum timing.

Figure 14:
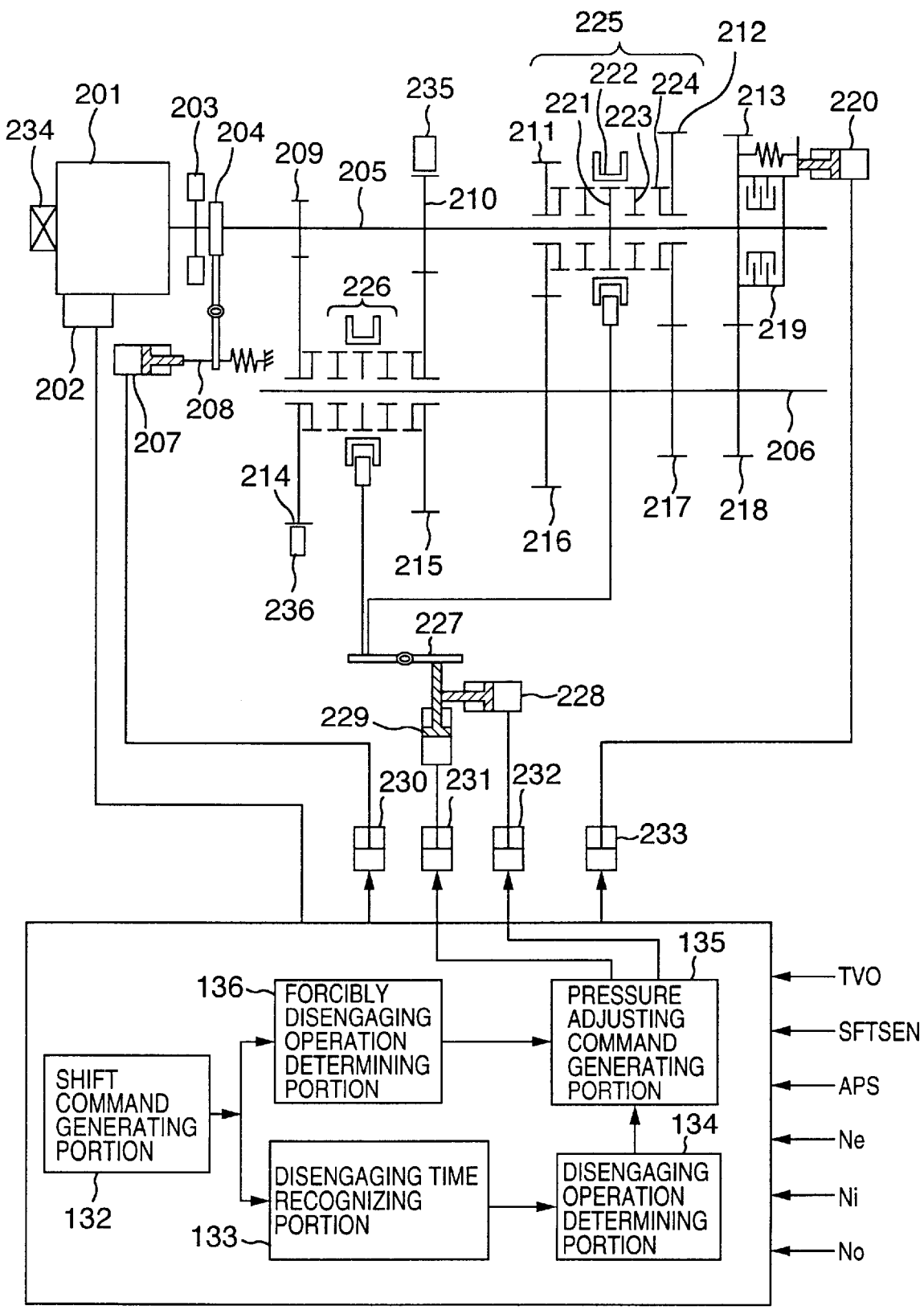
FIG. 14 is a schematic view of an automatic transmission and a control unit for the automatic transmission according to an embodiment of the present invention.

FIG. 14 is a schematic view of an automatic transmission and a control unit of the same in accordance with an embodiment of the present invention.

An engine 201 is provided with an electronic control throttle 202 for adjusting an engine torque and a rotational number sensor 234 for measuring a rotational number Ne of the engine 201, whereby it is possible to control the torque of the engine 201 at a high accuracy. The torque generated in the engine 201 is transmitted to an output shaft 206 via a clutch 204 and a gear type speed change mechanism provided between the engine 201 and the output shaft 206. The clutch 204 is engaged and disengaged by an oil pressure of a cylinder 207. The oil pressure of the cylinder 207 is applied to the clutch 204 via a wire 208, and the clutch 204 is engaged with a flywheel 203 in an engine side by being pressed thereto.

A basic structure of the gear type speed change mechanism is constituted by a plurality of gears mounted to respective shafts forming the input shaft 205, the output shaft 206 and the shift stage.

The torque output from the engine 201 is transmitted to the output shaft 206 through the gear employed for each of the shift stages from the input shaft 205 via the clutch 204. Among a plurality of gears, a gear 209 and a gear 210 are adhered to the input shaft 205 so as to rotate, and gears 216, 217 and 218 are adhered to the output shaft 206 so as to rotate. The other gears race with respect to the respective shafts.

Gear type clutches 225 and 226 are constituted by a clutch hub 221, a sleeve 222, a synchronizer ring 223 and a gear spline 224. The gear type clutches 225 and 226 are engaged and disengaged in accordance that a shift fork 227 strokes, and rotate in such a manner as to synchronize an adjacent gear to the racing shaft at a time of being engaged. Further, at a time of being disengaged corresponding to a neutral state, the adjacent gear is in a racing state, so that a power transmission is not performed. The shift fork 227 mentioned above is operated due to the oil pressure applied to cylinders 228 and 229.

Gears 210 and 214 are respectively employed as rotational number detectors of the adhered shafts, and can respectively detect an input shaft rotational number Ni and an output shaft rotational number No by rotational number sensors 235 and 236.

A gear 213 mounted to the input shaft 205 has a friction clutch 219, and a torque can be transmitted from the input shaft 205 to the output shaft 206 via a gear 218 in accordance with an engagement of a friction clutch 219. A wet-type multi disc clutch is employed for the friction clutch 219, and is engaged and disengaged due to the oil pressure applied to a piston 220. In this case, the embodiment shown in FIG. 14 is structured such that the friction clutch 219 is mounted to the input shaft, however, the structure may be made such that a third shaft is newly provided, and the friction clutch 219 is placed on the shaft so as to transmit the power to the output shaft.

In a normal gear type transmission, the structure is made such as to disengage the clutch 204 at a time of shifting so as to temporarily shut the power transmission from the engine 201 to the output shaft 206. The speed change is executed by operating the engaging type clutches 225 and 226 during this period so as to obtain a predetermined speed change ratio and thereafter engaging the clutch 204 again. In this speed changing operation, a torque interruption during the speed changing operation is generated, thereby giving a feeling of physical disorder to a passenger. However, in the gear type speed changing mechanism shown in FIG. 14, since the speed changing operation is executed by gradually engaging the friction clutch 219 in a state that the clutch 204 is engaged so as to reduce the rotational number of the input shaft 205 and switching the engaging type clutches 225 and 226 during the speed change and realize an improved speed change characteristic.

Next, a description will be given of a controller 131 which controls the engine 201 and the actuators 230, 231, 232 and 233. A throttle opening degree TVO, an accelerator pedal pedaling amount APS, an engaging type clutch position SFTSEN, an engine rotational speed Ne detected from the rotational number sensor 234, an input shaft rotational number Ni detected from the rotational number sensor 235 and an output shaft rotational number No detected from the rotational number sensor 236 are input to the controller 131. A throttle valve opening degree, a fuel amount and an ignition timing are calculated within the control unit 131 so as to generate the engine torque, whereby the respective actuators (for example, the electronic control throttle 202) are controlled.

Further, the constituting elements within the control unit 131 are the same as those shown in FIG. 1, and a description thereof will be omitted. In this case, the clutch which is disengaged on the basis of the command output from the pressure adjusting command generating portion 135 in the speed changing operation is the engaging type clutch 225 or 226.

In accordance with the structure mentioned above, even in the case that it is impossible to recognize the timing at which the engaging type clutch is disengaged, due to some reasons at a time of shifting (that is, in the case that the clutch is not disengaged (is kept to be engaged) when a predetermined time has passed after the shift command signal is generated, the clutch is disengaged), it is possible to securely disengage the engaging type clutch and it is possible to prevent the transmission from being broken due to a tie-up (simultaneous engagement) between the friction clutch and the engaging type clutch.

Further, in accordance with the present invention, in the automatic transmission which executes the shift by engaging or disengaging a predetermined friction device, it is possible to securely prevent the early disengage due to the erroneous recognition of the disengage timing of the disengaged side friction device or the tie-up due to the miss-recognition thereof and always realize a control of accurately and reliably shifting the clutch.

What is claimed is:

1. A control method of an automatic transmission having a friction clutch corresponding to torque transmitting means disposed between an input shaft and an output shaft in at least one shift stage and an engaging type clutch corresponding to torque transmitting means disposed between an input shaft and an output shaft in the other shift stages, comprising the steps of:

outputting a signal for disengaging said engaging type clutch at a disengaging timing of said engaging type clutch by calculating said disengaging timing of said engaging type clutch after a shift command signal is generated; and outputting a signal for disengaging said engaging type clutch in the case that said engaging type clutch is not disengaged when a predetermined time has passed after said shift command signal is generated.

2. A control unit of an automatic transmission having a friction clutch corresponding to torque transmitting means disposed between an input shaft and an output shaft in at least one shift stage and an engaging type clutch corresponding to torque transmitting means disposed between an input shaft and an output shaft in the other shift stages, comprising:

shift command generating means for generating a shift command signal;

disengaging timing recognizing means for recognizing a disengaging timing of said engaging type clutch after said shift command signal is generated;

disengagement determining means for outputting a signal for disengaging said engaging type clutch at said disengaging timing on the basis of the recognized result of said disengaging timing recognizing means; and forcible disengagement determining means for outputting a signal for disengaging said engaging type clutch in the case that said engaging type clutch is not disengaged when a predetermined time pass passed after said shift command signal is generated.

3. A control unit of an automatic transmission having a friction clutch corresponding to torque transmitting means disposed between an input shaft and an output shaft in at least one shift stage and an engaging type clutch corresponding to torque transmitting means disposed between an input shaft and an output shaft in other shift stages, comprising;

disengage timing recognizing means which recognizes a disengage timing at a time of shifting said automatic transmission;

first disengage determining means which determines a disengage operation of said disengage side friction device on the basis of a result of recognition by said disengage timing recognizing means; and second disengage determining means which forcibly determines a disengage operation of said disengage side friction device in the case that it is impossible to recognize said disengage timing in said disengage timing recognizing means, wherein a pressure adjusting command generating means is provided to disengage said disengage side friction device on the basis of determination of said first and second disengage determining means.

4. A control unit of an automatic transmission having a friction clutch corresponding to torque transmitting means disposed between an input shaft and an output shaft in at least one shift stage and an engaging type clutch corresponding to torque transmitting means disposed between an input shaft and an output shaft in other shift stages, comprising:

disengage timing recognizing means which recognizes a disengage timing of a disengage side friction device at a time of shifting said automatic transmission;

first disengage determining means which determines a disengage operation of said disengage side friction device on the basis of a result of recognition by said disengage timing recognizing means; and second disengage determining means which forcibly determines a disengage operation of said disengage side friction device in the case that it is impossible to recognize said disengage timing in said disengage timing recognizing means, wherein a pressure adjusting command generating means is provided to disengage said disengage side friction device on the basis of determination of said first and second disengage determining means, and there is further provided disengage inhibiting means for inhibiting a disengage of said disengage side friction device for a predetermined period after said automatic transmission starts shifting.

5. A control method of an automatic transmission having a friction clutch corresponding to torque transmitting means disposed between an input shaft and an output shaft in at least one shift stage and an engaging type clutch corresponding to torque transmitting means disposed between an input shaft and an output shaft in other shift states, comprising:

recognizing a disengage timing of a disengage side friction device at a time of shifting said automatic transmission;

determining a disengage operation of said disengage side friction device on the basis of said recognized result;

forcibly determining a disengage operation of said disengage side friction device in the case that it is impossible to recognize said disengage timing; and operating a pressure adjusting command generating means so as to disengage said disengage side friction device on the basis of these determinations.

6. A control method of an automatic transmission having a friction clutch corresponding to torque transmitting means disposed between an input shaft and an output shaft in at least one shift stage and an engaging type clutch corresponding to torque transmitting means disposed between an input shaft and an output shaft in other shift stages, comprising:

recognizing a disengage timing of a disengage side friction device at a time of shifting said automatic transmission;

determining a disengage operation of said disengage side friction device on the basis of said recognized result;

forcibly determining a disengage operation of said disengage side friction device in the case that it is impossible to recognize said disengage timing;

operating a pressure adjusting command generating means so as to disengage said disengage side friction device on the basis of these determinations; and inhibiting a disengage of said disengage side friction device for a predetermined period after said automatic transmission starts shifting.

* * * * *